United States Patent [19]

Bowen et al.

[11] Patent Number: 5,336,734

[45] Date of Patent: Aug. 9, 1994

[54] TEXTILE FIBERS OF SULFONATED POLY(P-PHENYLENE TEREPHTHALAMIDE)

[75] Inventors: Michael W. Bowen; Hamid M. Ghorashi, both of Midlothian; Hung H. Yang, Richmond, all of Va.

[73] Assignee: E. I. Du Pont de Nemours and Company, Wilmington, Del.

[21] Appl. No.: 47,394

[22] Filed: Apr. 19, 1993

[51] Int. Cl.⁵ .................... C08F 283/04; C08G 69/42
[52] U.S. Cl. ......................... 525/420; 8/115.54; 8/539; 528/337
[58] Field of Search ................ 525/420; 528/337; 8/115.54, 539

[56] References Cited

U.S. PATENT DOCUMENTS

| Re. 30,352 | 7/1980 | Kwolek | 260/30.8 |
| 3,767,756 | 10/1973 | Blades | 264/184 |
| 4,075,269 | 2/1978 | Jones, Jr. et al. | 264/184 |
| 4,112,016 | 9/1978 | Moulds | 260/849 |
| 4,162,346 | 7/1979 | Jones et al. | 528/337 |
| 4,374,977 | 2/1983 | Fujiwara et al. | 528/348 |

FOREIGN PATENT DOCUMENTS

| 0427280 | 5/1991 | European Pat. Off. |
| 16762 | 2/1975 | Japan. |
| 59-1710 | 1/1984 | Japan. |

*Primary Examiner*—Morton Foelak

[57] ABSTRACT

A textile fiber of sulfonated poly(p-phenylene terephthalamide) that is rapidly dyeable to deep shades.

2 Claims, No Drawings

TEXTILE FIBERS OF SULFONATED POLY(P-PHENYLENE TEREPHTHALAMIDE)

BACKGROUND OF THE INVENTION

1. Field of the Invention

This invention relates to textile quality fibers of sulfonated poly(p-phenylene terephthalamide). The fibers of this invention can be dyed to deep shades rapidly and without need for a carrier. They exhibit ease of crimp and other desirable qualities.

2. Description of the Prior Art

U.S. Pat. Nos. 4,075,269 and 4,162,346, issued Feb. 21, 1978 and Jul. 24, 1979 to Jones et al., disclose the spinning of low inherent viscosity sulfonated poly(p-phenylene terephthalamide) into fibers. Jones et al. teach that the sulfonated polyamide can be prepared from the appropriate sulfonated diamine or diacid derivatives or mixtures thereof. Alternatively, poly(p-phenylene terephthalamide) (PPD-T) may be sulfonated according to Jones et al. using either concentrated sulfuric acid or fuming sulfuric acid. The as-spun fibers of the Jones et al. patents exhibit single filament tenacities of about 10 grams per denier, an elongation of about 2.5% and an initial modulus of about 200 grams per denier. Jones et al. heat treat the as-spun fiber to achieve tenacities of at least 15 grams per denier, an elongation of at least 1.5%, e.g. 2-3.5% and a modulus of at least 400 grams per denier. Such fibers are high performance fibers not of textile quality.

SUMMARY OF THE INVENTION

The present invention provides a fiber of sulfonated poly(p-phenylene terephthalamide) having an inherent viscosity of from about 1.5 to 4 and from 5 to 20 mols of sulfur, as sulfonate groups per 100 mols of polymer repeat units, the said fiber exhibiting a modulus of less than 200 grams per denier and an elongation greater than 6%.

DETAILED DESCRIPTION OF THE INVENTION

Fibers made from PPD-T are well known for their extremely high strength and high modulus. For some end-use applications, however, as for textiles, the high modulus is a disadvantage since fabrics thereof tend to be very stiff and uncomfortable. In addition, dyeability and particularly ease of dyeability by which is meant the ability to be dyed rapidly to deep shades without need for carrier or high pressure equipment, become important considerations in textile applications (apparel) as distinguished from industrial applications. Dye carriers are often considered to be environmentally undesirable. It has now been discovered that fibers made of sulfonated PPD-T having an inherent viscosity of from about 1.5 to 4, and containing from 5 to 20 mols of sulfur as sulfonate groups per 100 mols of p-phenylene terephthalamide units (the repeat units of the polymer chain) possess the properties needed for comfortable, readily dyeable textile fabrics.

By PPD-T is meant the homopolymer resulting from polymerization of p-phenylene diamine and terephthaloyl chloride and, also, copolymers resulting from incorporation of small amounts of other diamines with the p-phenylene diamine and/or of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, provided only that the other diamines and diacid chlorides have no reactive groups which interfere with the polymerization reaction. Preparation of PPD-T is described in U.S. Pat. Nos. 3,869,429; 4,308,374; and 4,698,414.

In a convenient way to practice this invention, high inherent viscosity (greater than about 5), PPD-T is mixed with sulfuric acid of a concentration of 100.2 to 102% to cause the desired degree of sulfonation of the PPD-T molecules. Conditions are carefully controlled such that PPD-T is degraded, i.e., the molecular weight is reduced to provide an inherent viscosity (IV) level of from about 1.5 up to 4 (as measured on the spun yarn) while, at the same time, achieving the desired degree of sulfonation.

The degree of sulfonation and the degree of degradation form a balance which is controlled by the sulfuric acid concentration, the polarmet concentration in the solutioning system, the time of exposure of polymer to the acid, and the temperature of the solution during exposure.

It has been found useful to employ sulfuric acid of concentration between about 100.2% and 102% in the solutioning system. Acid concentrations above about 103% may cause unacceptably severe polymer degradation. Polymer concentration selection is an important consideration in preparing products of the invention. Polymer concentrations above 15 wt. % polymer in the solution will not yield the crystal structure contemplated herein nor will polymer which has not been degraded sufficiently, i.e. above an IV of 4.

The time and temperature at which the polymer is exposed to the acid will affect the degree of sulfonation and polymer degradation. Temperatures in the range of 75° to 120° C. and time periods of from 10 min. to 2 hours have been found useful.

The inherent viscosity which is determined as described below, is a measure of the molecular weight of the polymer and serves as a measure of the severity of degradation which the polymer has undergone in the sulfonation process.

In preparation of fibers of the invention, the spinning solution is conveniently made by dissolving the PPD-T at the desired concentration in fuming sulfuric acid. The concentration of polymer in the acid is generally about 9 to 15 wt. %, and preferably about 12 wt. %. The concentration level should not exceed 15 wt. % to assure the presence of the Haraguchi crystal form in the resulting fiber. The Haraguchi crystal form is characterized by a single major diffraction peak at a Bragg angle of about 23 degrees and two minor peaks, one at a Bragg angle of about 17 degrees and one at about 27 degrees as determined by equatorial wide angle diffraction. Presence of the Haraguchi crystal form is a characteristic of fibers of the present invention.

The sulfonation conditions employed in the present invention result in sulfur levels of 5 to 20 mols as sulfonate groups per 100 mols of polymer repeat units. Determination of sulfur content is described below.

Fibers of the present invention can be spun using the air-gap spinning conditions of U.S. Pat. No. 3,767,756 or the wet-spinning conditions of Kwolek (U.S. Pat. No. 3,671,542). If desired, the fiber of this invention may be produced in colors by incorporating a pigment in the spin solution. The sulfonated PPD-T solution can be extruded through spinnerets with orifices ranging from about 0.025 to 0.25 mm in diameter. The number, size, shape, and configuration of the orifices can be varied to achieve the desired fiber product. The extruded dope is fed into a coagulation bath with or without prior passage through a noncoagulating fluid layer. The noncoagulating fluid layer is generally air but can be any other inert gas or liquid which is a noncoagulant for the dope. The noncoagulating fluid layer is generally from 0.1 to 10 centimeters in thickness.

The coagulating bath is aqueous and may contain as much as 70% sulfuric acid. Preferably the bath temperatures should range from about 25° to 80° C. or slightly higher.

After the extruded dope has been conducted through the coagulating bath and the dope has coagulated into an acid/water-swollen fiber, the fiber must be thoroughly washed to first extract the acid and then neutralize acid groups. The fiber-washing solution can be water, followed by alkaline water. The wet and swollen fiber is next conducted to a fiber drying step under low or no tension, as desired for final fiber qualities. Drying the fibers under tension generally causes a decrease in elongation to break and an increase in modulus and tenacity.

The sulfonated PPD-T fibers of this invention exhibit ease of dyeability. In particular, they may be deep dyed as described below without the use of carrier or need for high pressure, by which is meant, they will exhaust dye from a dye bath which has no carrier or additional chemical added to swell the fiber. They are useful in flame resistant fabrics because of their lack of thermal shrinkage. The high moisture regain and good wickability contribute to the overall comfort exhibited by fabrics of the fiber.

TEST METHODS

Inherent Viscosity (IV) is defined by the equation:

$$IV = ln(\eta_{rel})/c$$

where c is the concentration (0.5 gram of polymer in 100 ml of solvent) of the polymer solution and $\eta_{rel}$ (relative viscosity) is the ratio between the flow times of the polymer solution and the solvent as measured at 30° C. in a capillary viscometer. The inherent viscosity values are reported and specified herein are determined using concentrated sulfuric acid (96% $H_2SO_4$).

Modulus is reported as the slope of the initial stress/strain curve. Modulus is first computed in g/denier units which are converted to dN/tex units. Each reported measurement is the average of 5 breaks.

Elongation is the percent increase in length at break.

SULFUR CONTENT

A yarn sample of small quantity (about 0.5 gram) is dissolved in about 96% sulfuric acid, and water is then added to precipitate the polymer. Water is continuously added thereafter, to thoroughly wash the polymer to remove any free sulfate, such as sodium sulfate, from the polymer. The resulting polymer sample is further dried and carefully weighed before being placed in a Schoniger flask for combustion with pure oxygen. $SO_2$ and $SO_3$ generated by the combustion are absorbed in water to form sulfuric acid. The acid is titrated using barium chloride to determine the sulfur content, as bound sulfonic acid or sulfonate group, or the original yarn sample.

DYEING TEST

An approximately four-gram sample of fiber is dried to constant weight at 60° C. In a 500-ml beaker, a dye solution is prepared containing 4% each, based on fiber weight, of Basacryl Red G1 (Basic Red 29) and sodium sulfate in 400 mls of water. The dye solution is heated with stirring to a rigorous boil at atmospheric conditions. The fiber sample is added and the stirring and boiling continued for up to 45 min. During this period the beaker is loosely covered to minimize water loss. After the allotted time, the fiber mass is removed, wrung dry over the dye solution and dried to constant weight at 60° C. The test can be varied by changing the dye content of the bath, the temperature of the bath or the time of exposure in the bath. Increasing any of these variables can be expected to increase dye pick-up.

The fiber is then wrapped around a card and its color measured (Hunter colorimeter, daylight measurement). The spent dye solution is diluted to 400 ml with water to compensate for any losses in boiling and its color is measured reading absorbance "L" value at 492 nm in a 0.1 mm cell. L=0 is black while L=100 is white. The dyeability is assessed either by the dye loss from the dye solution, which is proportional to the decrease of solution color, or the color increase in the fiber. Both are susceptible to scatter. A trained eye can easily rank the relative dyeability of samples without colorimetric measurements.

The following examples are illustrative of the invention and are not to be construed as limiting.

EXAMPLE 1

This example illustrates the preparation of a sulfonated poly(p-phenylene terephthalamide) with textile-like properties which can be dyed rapidly to a deep shade in the absence of carrier.

In a continuous process, a dry poly(p-phenylene terephthalamide) (PPD-T) with an inherent viscosity of 6.3 dL/g was mixed with 100.4% sulfuric acid in a jacketed high-shear mixer to form a spin solution of 12.0% by weight of PPD-T in $H_2SO_4$. The temperature was controlled so that the solution exited at about 110° C. The solution was pumped through a transfer line with a jacket temperature of 80° C. into a holdup tank with a jacket temperature of 70° C. The total residence time of the spin solution in the mixer and in the transfer line was about 30 min. The holdup tank provided a holdup time of about 1½ to 2 hours under gentle mixing to ensure that the solution was homogeneous and uniform in polymer concentration. A specimen of the spin solution taken at the inlet of the holdup tank gave a polymer inherent viscosity of 2.7 dL/g. This indicates that the polymer had degraded and sulfonated as it passed from the mixer through the transfer line.

The spin solution was converted to filament yarn by conventional wet spinning. It was continuously withdrawn from the holdup tank and pumped through a transfer line with a jacket temperature of 70° C. into two spinning heads each of which consisted of a meter pump and a spinneret assembly. All of the spinning head parts were maintained at 70° C. The solution was then extruded from the spinnerets which were immersed at a depth of about 7.6 cm in an aqueous coagulation liquid. The aqueous coagulation liquid contained about 10% sulfuric acid and was maintained at about 80° C. Each of the spinnerets had 3715 holes of 0.035 mm diameter. The extruded filaments passed through the coagulation liquid at a slight angle for a distance of about 53.3 cm before exiting from the coagulation bath. The coagulated filaments were gathered as a tow, washed with water, neutralized with 0.4% NaOH solution at 40° C. and washed again with water. The fully washed and neutralized tow was then dried and wound up on a bobbin at a windup speed of 50 ypm (45.7 m/min). The dried yarn had about 12% moisture based on the weight of polymer at the end of drying.

The resulting yarn had an inherent viscosity of about 2.40 dL/g. It was of 11,145 denier (about 10,000 dtex) at 1.5 denier per filament. It exhibited a tenacity of 5.0 gpd, elongation at break of 9.3%, and an initial modulus of 140 gpd. It had a density of about 1.44 g/cc, and a moisture regain of about 8.5%. This fiber was found to have 15 mols of sulfur as sulfonate groups per 100 mols of p-phenylene terephthalamide repeat units in the polymer.

Equatorial wide angle x-ray diffraction of this fiber gave a one-peak pattern (Haraguchi crystal form) at a Bragg angle (two theta) of about 23 degrees instead of the two-peak pattern which is characteristic of high strength, high modulus PPD-T fiber. It is widely known in the literature that the two-peak pattern (Northolt crystal form) consists of a diffraction peak at a Bragg angle of 21 degrees and another peak at 23 degrees. (For reference, see "Aromatic High-Strength Fibers" by H. H. Yang, Wiley-Interscience, N.Y., 1989, pp 253-259)

The above fiber exhibited unique dyeability. At atmospheric dyeing conditions, the fiber exhausted the dye bath within 10 minutes and dyed to a deep red color.

EXAMPLE 2

This example illustrates the preparation of a producer-colored fiber of the invention.

The procedure of Example 1 was repeated except that a 5% by weight solution of sage green pigment in sulfuric acid at about 60° C. was added to the spin solution before the spinning head. The flow rate and concentration of unpigmented spin solution and the pigment solution were controlled so that the final pigmented spin solution contained a total solids of about 12% by weight of polymer. The pigmented solution was spun in a manner similar to that of Example 1 to give yarn of sage green color.

EXAMPLE 3

This example illustrates another preparation of a sulfonated poly(p-phenylene terephthalamide) with textile like properties which can be dyed rapidly to a deep shade in the absence of carrier.

A fiber was made in a manner similar to Example 1 except 101.0% sulfuric acid was used. The yarn inherent for the spun fiber was 2.99 dl/g. The tenacity (gpd)/elongation (%)/modulus (gpd) balance of the fiber was 2.8/8.1/90.0. The density of the fiber was 1.43 and the fiber was found to have 18 mols of sulfur as sulfonate group per 100 moles of p-phenylene terephthalamine. A second sample was taken of the same spin and yarn inherent for the spun fiber was 3.05 dl/g. with a tenacity, elongation, modulus balance of 3.7/8.3/120. This fiber had a density of 1.43 and was found to have 16 mols of sulfur as sulfonate groups per 100 mols of p-phenylene terephthalamine repeat units in the polymer. The equatorial wide angle x-ray defraction patterns of these samples are the same as Example 1 and these fibers exhibited unique dyeability in that under atmospheric dyeing conditions the fibers exhausted the dye bath within ten minutes and dyed a deep red color.

EXAMPLE 4

This example illustrates the dyeability improvement of the fiber of this invention over that in the prior art. Fibers disclosed in European Patent Application number 427,280 under the name of Chiou were made in accordance with the procedure of that application and were dyed as outlined below. Fibers of this invention were made as outlined in Example 1.

As shown in the table, fibers in the prior art are very difficult to dye to deep shapes and require either a dye carrier, extensive time, increased dye concentration, or increased bath temperature in order to dye to deep, dark shades. In contrast, the fiber of this invention is able to dye to very deep shades very quickly with normal atmospheric conditions using a small quantity of dye and no carrier.

TABLE

| Example/ Type | Carrier Added | Dye Conc. | Temp | Time | "L" Value Range |
|---|---|---|---|---|---|
| Control | — | — | — | — | 70–75 |
| Prior Art | No | 4% | 100° C. | 60–75 min | 43–49 |
| " | No | 4% | 130° C. | 60–75 min | 34–34 |
| " | No | 4% | 145° C. | 60–75 min | 34–35 |
| " | Yes | 4% | 130° C. | 60–75 min | 33–34 |
| " | No | 10% | 120° C. | 60 min | 39–43 |
| " | No | 16% | 120° C. | 60 min | 31 |
| " | No | 24% | 120° C. | 60 min | 31 |
| This Invention | No | 4% | 100° C. | 10 min | 26 |

We claim:

1. A textile quality fiber that is rapidly dyeable to deep shades consisting essentially of sulfonated poly(p-phenylene terephthalamide) having an inherent viscosity of about 1.5 to 4 measured at 30° C. at a concentration of 0.5 gram of polymer in 100 ml of 96% $H_2SO_4$ and from 5 to 20 mols of sulfur as sulfonate groups per 100 mols of p-phenylene terephthalamide polymer repeat units, the said fiber exhibiting a modulus of less than 200 grams per denier and an elongation greater than 6%.

2. The fiber of claim 1 additionally containing a pigment.

* * * * *